United States Patent
Maruyama (10) Patent No.: US 8,306,721 B2
(45) Date of Patent: Nov. 6, 2012

(54) INTERNAL COMBUSTION ENGINE SYSTEM, METHOD OF CONTROLLING INTERNAL COMBUSTION ENGINE SYSTEM, AND VEHICLE

(75) Inventor: Kenya Maruyama, Nissin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 428 days.

(21) Appl. No.: 12/750,766

(22) Filed: Mar. 31, 2010

(65) Prior Publication Data
US 2010/0262356 A1 Oct. 14, 2010

(30) Foreign Application Priority Data
Apr. 10, 2009 (JP) ................................. 2009-096211

(51) Int. Cl.
*B60T 7/12* (2006.01)

(52) U.S. Cl. .................... 701/103; 701/108; 123/434

(58) Field of Classification Search .......... 701/103–105, 701/108, 114; 123/434, 568.14
See application file for complete search history.

(56) References Cited

U.S. PATENT DOCUMENTS

| 6,386,182 B2 * | 5/2002 | Kowatari et al. | 123/399 |
| 6,834,645 B2 * | 12/2004 | Takizawa et al. | 123/674 |
| 7,092,813 B2 * | 8/2006 | Abe et al. | 701/104 |
| 7,814,785 B2 * | 10/2010 | Sukegawa et al. | 73/204.27 |
| 8,201,396 B2 * | 6/2012 | Kawamura et al. | 60/295 |

FOREIGN PATENT DOCUMENTS

| JP | 2004108329 A | 4/2004 |
| JP | 2006161575 A | 6/2006 |

* cited by examiner

*Primary Examiner* — John Kwon
(74) *Attorney, Agent, or Firm* — Gifford, Krass, Sprinkle, Anderson & Citkowski, P.C.

(57) ABSTRACT

An internal combustion engine system includes: an internal combustion engine; a valve regulating exhaust gas flow rate to an intake system; an exhaust gas recirculation system opening the valve to recirculate the exhaust gas to the intake system; an intake air flow rate detecting device detecting air flow rate introduced into the engine; and a controller, when fuel injection is stopped, controlling the engine to start the fuel injection at a rate obtained by adding a first flow rate to a reference flow rate for a stoichiometric air-fuel ratio based on the detected air flow rate when the valve opening degree is lower than a predetermined degree, and controlling the engine to start the fuel injection at a rate obtained by adding a second flow rate, larger than the first flow rate, to the reference flow rate when the valve opening degree is no less than the predetermined degree.

12 Claims, 5 Drawing Sheets

INTERNAL COMBUSTION ENGINE SYSTEM, METHOD OF CONTROLLING INTERNAL COMBUSTION ENGINE SYSTEM, AND VEHICLE

INCORPORATION BY REFERENCE

The disclosure of Japanese Patent Application No. 2009-096211 filed on Apr. 10, 2009 including the specification, drawings and abstract is incorporated herein by reference in its entirety.

BACKGROUND OF THE INVENTION

1. Field of the Invention

The invention relates to an internal combustion engine system, a method of controlling the internal combustion engine system, and a vehicle.

2. Description of the Related Art

Japanese Patent Application Publication No. 2006-161575 (JP-A-2006-161575) describes an internal combustion engine system according to a related art. The internal combustion engine system includes a throttle valve, an exhaust gas recirculation passage, and a catalyst. The throttle valve is driven by a throttle motor. The exhaust gas recirculation passage provides fluid communication between an intake passage and an exhaust passage. An EGR valve is provided in the exhaust gas recirculation passage. The catalyst is installed in the exhaust passage for purifying exhaust gas. Exhaust gas is recirculated to the intake passage during execution of fuel cut at the time of deceleration. In this system, when depression of an accelerator pedal is detected during fuel cut, the flow rate of exhaust gas recirculated to the intake passage during a period from when the depression of the accelerator pedal is detected to when the opening degree of the throttle valve is actually varied is attenuated, thus reducing a decrease in acceleration at the time of forcible return from fuel cut.

Generally, in order to suppress a decrease in output torque at the time of return from fuel cut, the above described internal combustion engine system executes control for starting fuel injection at a fuel injection flow rate that is obtained by increasing a reference fuel injection flow rate by a correction flow rate. The reference fuel injection flow rate is set so as to attain a stoichiometric air-fuel ratio with respect to an intake air flow rate. The intake air flow rate is detected by a sensor, such as an air flow meter, installed in an intake pipe. However, when EGR is being performed, the intake air flow rate detected by the sensor differs from the air flow rate actually introduced into a combustion chamber of an internal combustion engine. Therefore, it is desirable to further appropriately increase the reference fuel injection flow rate by a correction flow rate to resume fuel injection.

SUMMARY OF THE INVENTION

The invention provides an internal combustion engine system, a method of controlling the internal combustion engine system, and a vehicle that further appropriately resume fuel injection when fuel injection to an internal combustion engine is resumed while fuel injection to the internal combustion engine in operation is stopped.

A first aspect of the invention relates to an internal combustion engine system. The internal combustion engine system includes: an internal combustion engine; a valve that regulates a flow rate at which exhaust gas of the internal combustion engine is supplied to an intake system of the internal combustion engine; an exhaust gas recirculation system that opens the valve to recirculate the exhaust gas to the intake system; an intake air flow rate detecting device that detects an air flow rate at which air is introduced into the internal combustion engine; and a controller that, when fuel injection in the internal combustion engine in operation is stopped, controls the internal combustion engine so that i) the fuel injection is started at a fuel injection flow rate that is obtained by adding a first increasing correction flow rate to a reference fuel injection flow rate that is set so as to give a stoichiometric air-fuel ratio on the basis of the detected air flow rate when the opening degree of the valve is lower than a predetermined opening degree, and controls the internal combustion engine so that ii) the fuel injection is started at a fuel injection flow rate that is obtained by adding a second increasing correction flow rate, which is set to be larger than the first increasing correction flow rate, to the reference fuel injection flow rate when the opening degree of the valve is higher than or equal to the predetermined opening degree.

With the above configuration, when fuel injection to the internal combustion engine in operation is resumed while fuel injection to the internal combustion engine is stopped, the internal combustion engine is controlled so that the fuel injection to the internal combustion engine is started at a fuel injection flow rate that is obtained by adding a first increasing correction flow rate to a reference fuel injection flow rate that is set so as to give a stoichiometric air-fuel ratio on the basis of the intake air flow rate of the internal combustion engine when the opening degree of the valve of the exhaust gas recirculation system is lower than a predetermined opening degree. In addition, the internal combustion engine is controlled so that the fuel injection to the internal combustion engine is started at a fuel injection flow rate that is obtained by adding a second increasing correction flow rate, which is set to be larger than the first increasing correction flow rate, to the reference fuel injection flow rate when the opening degree of the valve of the exhaust gas recirculation system is higher than or equal to the predetermined opening degree. By so doing, it is possible to further appropriately resume fuel injection.

The internal combustion engine according to the above aspect may further include: an intake air pressure detecting device that detects an intake air pressure, which is a pressure of air in the intake system; and a valve check execution unit that, when the fuel injection is stopped and a predetermined check condition for checking normal operation of the valve holds, executes valve check for checking whether the valve is normally operated on the basis of the intake air pressure detected along with open valve control for opening the valve of the exhaust gas recirculation system and valve close control for closing the valve of the exhaust gas recirculation system while the opening degree of a throttle valve of the internal combustion engine is set at a predetermined opening degree in a state where the stop of the fuel injection is continued, wherein the controller, when the valve is being checked by the valve check execution unit, may control the internal combustion engine so that the fuel injection is started at a fuel injection flow rate that is obtained by adding the first increasing correction flow rate to the reference fuel injection flow rate i) when the opening degree of the valve of the exhaust gas recirculation system is lower than the predetermined opening degree, and may control the internal combustion engine so that the fuel injection is started at a fuel injection flow rate that is obtained by adding the second increasing correction flow rate to the reference fuel injection flow rate ii) when the opening degree of the valve of the exhaust gas recirculation system is higher than or equal to the predetermined opening degree. With the above configuration, it is possible to further appropriately resume fuel injection when fuel injection to the internal combustion engine is resumed while the valve is being checked.

In the internal combustion engine system according to the above aspect, the predetermined check condition may hold when a predetermined period of time has elapsed after the valve is fully closed.

The internal combustion engine system according to the above aspect may further include a coolant temperature detecting device that detects a coolant temperature, which is a temperature of coolant that cools the internal combustion engine, wherein the predetermined check condition may hold when the coolant temperature is higher than or equal to a predetermined temperature.

In addition, in the internal combustion engine system according to the above aspect, the controller, when the fuel injection is stopped, may control the internal combustion engine so that fuel injection to the internal combustion engine is started at a fuel injection flow rate that is obtained by adding the second increasing correction flow rate to the reference fuel injection flow rate in order to start load operation of the internal combustion engine i) when the opening degree of the valve of the exhaust gas recirculation system is higher than or equal to the predetermined opening degree, and may control the internal combustion engine so that fuel injection to the internal combustion engine is started at a fuel injection flow rate that is obtained by adding a third increasing correction flow rate, which is different from the second increasing correction flow rate, to the reference fuel injection flow rate in order to start autonomous operation of the internal combustion engine ii) when the opening degree of the valve of the exhaust gas recirculation system is higher than or equal to the predetermined opening degree. With the above configuration, it is possible to further appropriately start load operation or autonomous operation.

A second aspect of the invention relates to a vehicle that includes an internal combustion engine system. The internal combustion engine system includes: an internal combustion engine; a valve that regulates a flow rate at which exhaust gas of the internal combustion engine is supplied to an intake system of the internal combustion engine; an exhaust gas recirculation system that opens the valve to recirculate the exhaust gas to the intake system; an intake air flow rate detecting device that detects an air flow rate at which air is introduced into the internal combustion engine; and a controller that, when fuel injection in the internal combustion engine in operation is stopped, controls the internal combustion engine so that i) the fuel injection is started at a fuel injection flow rate that is obtained by adding a first increasing correction flow rate to a reference fuel injection flow rate that is set so as to give a stoichiometric air-fuel ratio on the basis of the detected air flow rate when the opening degree of the is lower than a predetermined opening degree, and controls the internal combustion engine so that ii) the fuel injection is started at a fuel injection flow rate that is obtained by adding a second increasing correction flow rate, which is set to be larger than the first increasing correction flow rate, to the reference fuel injection flow rate when the opening degree of the valve is higher than or equal to the predetermined opening degree.

With the above configuration, a vehicle that includes an internal combustion engine that is able to further appropriately resume fuel injection is provided.

The vehicle according to the above aspect may include: a generator that is able to input or output power; a triaxial power input/output device that is connected to three shafts of a drive shaft coupled to an axle, an output shaft of the internal combustion engine and a rotary shaft of the generator and that, on the basis of powers input to or output from any two of the three shafts, inputs or outputs power to or from the remaining shaft; and an electric motor that is able to input or output power to or from the drive shaft.

A third aspect of the invention relates to a control method for an internal combustion engine system that includes an internal combustion engine, a valve that regulates a flow rate at which exhaust gas from the internal combustion engine is supplied to an intake system of the internal combustion engine, and an exhaust gas recirculation system that opens the valve to recirculate the exhaust gas to the intake system. The control method includes: when fuel injection in the internal combustion engine in operation is stopped, controlling the internal combustion engine so that the fuel injection is started at a fuel injection flow rate that is obtained by adding a first increasing correction flow rate to a reference fuel injection flow rate that is set so as to give a stoichiometric air-fuel ratio on the basis of an intake air flow rate of the internal combustion engine i) when the opening degree of the valve is lower than a predetermined opening degree, and controlling the internal combustion engine so that the fuel injection is started at a fuel injection flow rate that is obtained by adding a second increasing correction flow rate, which is set to be larger than the first increasing correction flow rate, to the reference fuel injection flow rate ii) when the opening degree of the valve is higher than or equal to the predetermined opening degree.

With the above configuration, when fuel injection to the internal combustion engine in operation is resumed while fuel injection to the internal combustion engine is stopped, the internal combustion engine is controlled so that the fuel injection to the internal combustion engine is started at a fuel injection flow rate that is obtained by adding a first increasing correction flow rate to a reference fuel injection flow rate that is set so as to give a stoichiometric air-fuel ratio on the basis of the intake air flow rate of the internal combustion engine when the opening degree of the valve of the exhaust gas recirculation system is lower than a predetermined opening degree. Then, the internal combustion engine is controlled so that the fuel injection to the internal combustion engine is started at a fuel injection flow rate that is obtained by adding a second increasing correction flow rate, which is set to be larger than the first increasing correction flow rate, to the reference fuel injection flow rate when the opening degree of the valve of the exhaust gas recirculation system is higher than or equal to the predetermined opening degree. By so doing, it is possible to further appropriately resume fuel injection.

The control method according to the above aspect may further include: when the fuel injection is stopped, and when a predetermined check condition for checking normal operation of the valve holds, executing valve check for checking whether the valve is normally operated on the basis of the intake air pressure detected along with open valve control for opening the valve of the exhaust gas recirculation system and valve close control for closing the valve of the exhaust gas recirculation system while the opening degree of a throttle valve of the internal combustion engine is set at a predetermined opening degree in a state where the stop of the fuel injection is continued, wherein, when the valve check is being executed, the internal combustion engine may be controlled so that the fuel injection is started at a fuel injection flow rate that is obtained by adding the first increasing correction flow rate to the reference fuel injection flow rate i) when the opening degree of the valve of the exhaust gas recirculation system is lower than the predetermined opening degree, and the internal combustion engine may be controlled so that the fuel injection is started at a fuel injection flow rate that is obtained by adding the second increasing correction flow rate to the reference fuel injection flow rate ii) when the opening degree of the valve of the exhaust gas recirculation system is higher than or equal to the predetermined opening degree.

In the control method according to the above aspect, the predetermined check condition may hold when a predetermined period of time has elapsed after the valve is fully closed.

The control method according to the above aspect may further include detecting a coolant temperature, which is a temperature of coolant that cools the internal combustion engine, wherein the predetermined check condition may hold when the coolant temperature is higher than or equal to a predetermined temperature.

In the control method according to the above aspect, when the fuel injection is stopped, the internal combustion engine may be controlled so that fuel injection to the internal combustion engine is started at a fuel injection flow rate that is obtained by adding the second increasing correction flow rate to the reference fuel injection flow rate in order to start load operation of the internal combustion engine i) when the opening degree of the valve of the exhaust gas recirculation system is higher than or equal to the predetermined opening degree, and the internal combustion engine may be controlled so that fuel injection to the internal combustion engine is started at a fuel injection flow rate that is obtained by adding a third increasing correction flow rate, which is different from the second increasing correction flow rate, to the reference fuel injection flow rate in order to start autonomous operation of the internal combustion engine ii) when the opening degree of the valve of the exhaust gas recirculation system is higher than or equal to the predetermined opening degree.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, an embodiment of the invention will be described.

Figure 1:
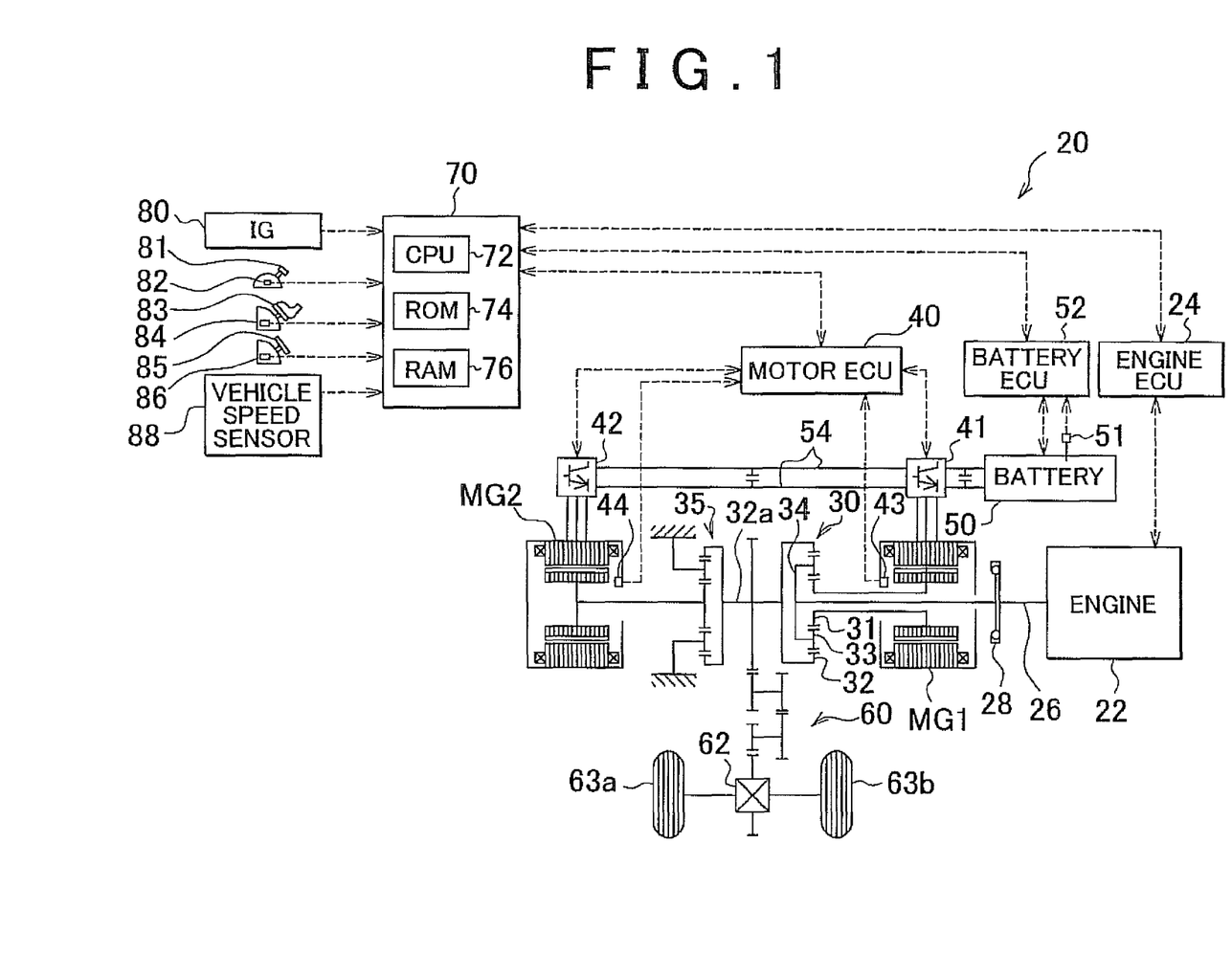
FIG. 1 is a configuration diagram that shows the schematic configuration of a hybrid vehicle 20 according to an embodiment of the invention.

FIG. 1 is a configuration diagram that shows the schematic configuration of a hybrid vehicle 20 equipped with an internal combustion engine system according to the embodiment of the invention. As shown in the drawing, the hybrid vehicle 20 according to the embodiment includes an engine 22, a planetary gear mechanism 30, a motor MG1, a motor MG2, a battery 50, and a hybrid electronic control unit 70. In the planetary gear mechanism 30, a carrier 34 is coupled to a crankshaft 26 via a damper 28. The crankshaft 26 serves as an output shaft of the engine 22. The motor MG1 is, for example, configured as a synchronous generator motor and is able to generate electric power. A rotor of the motor MG1 is connected to a sun gear 31 of the planetary gear mechanism 30. The motor MG2 is, for example, configured as a synchronous generator motor. A rotor of the motor MG2 is coupled via a reduction gear 35 to a ring gear shaft 32a connected to a ring gear 32 of the planetary gear mechanism 30. The motor MG2 is coupled to driving wheels 63a and 63b of the vehicle via the reduction gear 35, the ring gear shaft 32a, a gear mechanism 60 and a differential gear 62. The battery 50 exchanges electric power with the motors MG1 and MG2 via respective inverters 41 and 42. The hybrid electronic control unit 70 controls the vehicle overall. Note that the motors MG1 and MG2 each are driven by a motor electronic control unit (hereinafter, referred to as motor ECU) 40. The motor ECU 40 receives signals necessary for driving the motors MG1 and MG2, such as signals from rotational position detecting sensors 43 and 44. The rotational position detecting sensors 43 and 44 respectively detect the rotational positions of the rotors of the motors MG1 and MG2. The motor ECU 40 outputs switching control signals to the inverters 41 and 42. In addition, the motor ECU 40, where necessary, outputs data regarding the states of the motors MG1 and MG2 to the hybrid electronic control unit 70 via data communication. Furthermore, the battery 50 is controlled by a battery electronic control unit (hereinafter, referred to as battery ECU) 52. The battery ECU 52 receives signals necessary for controlling the battery 50, such as an inter-terminal voltage from a voltage sensor (not shown) installed between the terminals of the battery 50, a charge and discharge current from a current sensor (not shown) installed in a power line 54 connected to the output terminal of the battery 50 and a battery temperature Tb from a temperature sensor 51 installed to the battery 50. The battery ECU 52, where necessary, outputs data regarding the state of the battery 50 to the hybrid electronic control unit 70 via data communication.

Figure 2:
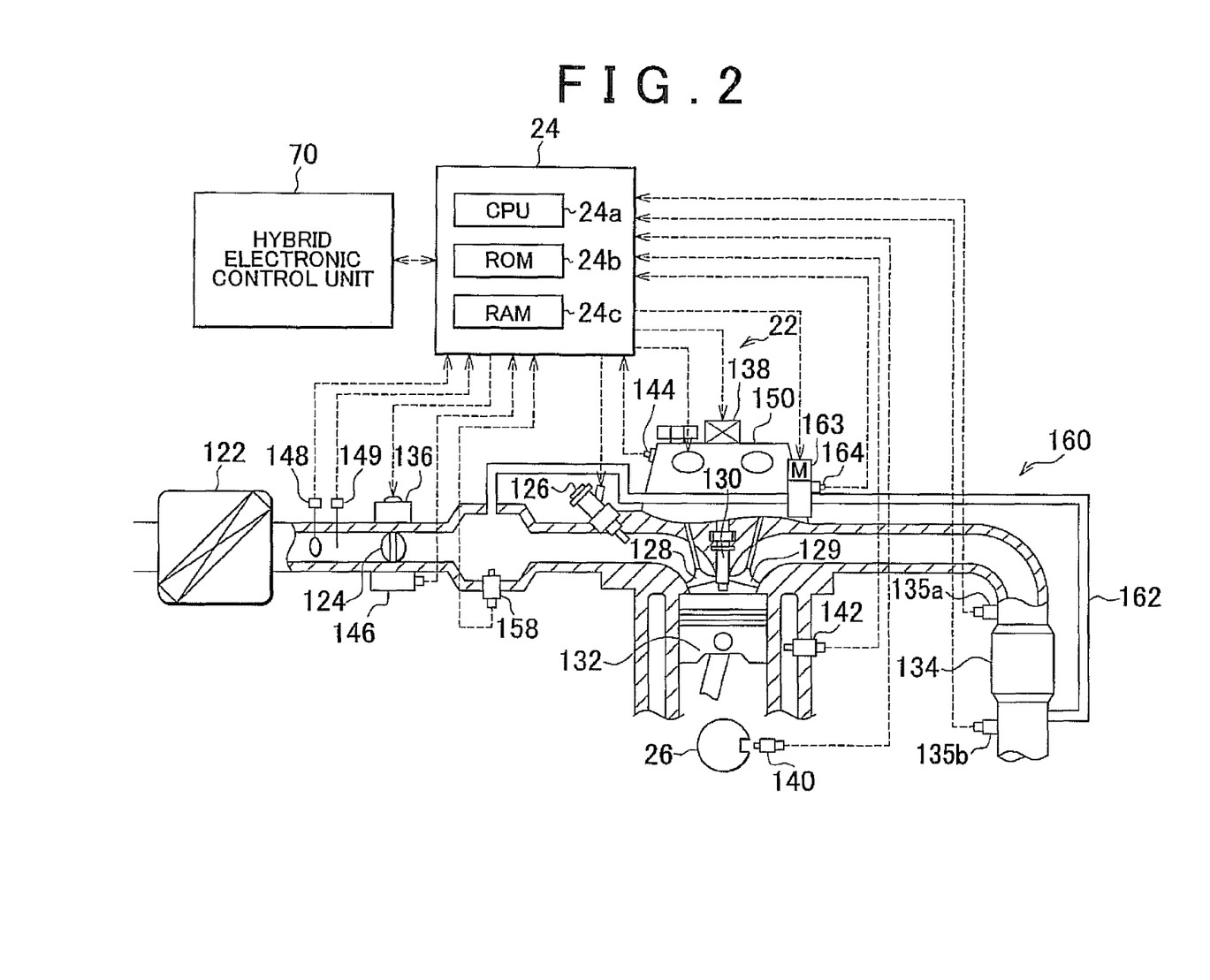
FIG. 2 is a configuration diagram that shows the schematic configuration of an engine 22.

The engine 22 is, for example, a four-cylinder internal combustion engine that is able to output power using hydrocarbon-based fuel, such as gasoline and light oil. As shown in FIG. 2, the engine 22 introduces air, cleaned by an air cleaner 122, via a throttle valve 124 and injects gasoline from a fuel injection valve 126 to mix the introduced air with the gasoline. The engine 22 introduces the air-fuel mixture into a combustion chamber via an intake valve 128 to cause explosion and combustion by electric spark made by an ignition plug 130. Thus, the engine 22 converts the reciprocating motion of a piston 132, pushed down by the generated energy, into the rotational motion of the crankshaft 26. Exhaust gas from the engine 22 is exhausted to outside air via a purifier 134 or is supplied to an intake side via an exhaust gas recirculation (EGR) system 160. The purifier 134 has a purification catalyst (three-way catalyst) that purifies hazardous components, such as carbon monoxide (CO), hydrocarbons (HC) and nitrogen oxides (NOx). The EGR system 160 includes an EGR pipe 162 and an EGR valve 164. The EGR pipe 162 is connected downstream of the purifier 134, and is used to supply exhaust gas to an intake-side surge tank. The EGR valve 164 is arranged in the EGR pipe 162, and is driven by a stepping motor 163. The EGR system 160 regulates the opening degree of the EGR valve 164 to adjust the supply of exhaust gas, or unburned gas, and then supplies the exhaust gas to the intake side. Thus, the engine 22 is configured to be able to introduce a mixture of air, exhaust gas and gasoline into the combustion chamber. Hereinafter, EGR means to supply exhaust gas of the engine 22 to the intake side.

The engine 22 is controlled by an engine electronic control unit (hereinafter, referred to as engine ECU) 24. The engine ECU 24 is formed of a microprocessor having a CPU 24a as a major component. The engine ECU 24 includes a ROM 24b, a RAM 24c, input and output ports (not shown) and a communication port (not shown) in addition to the CPU 24a. The ROM 24b stores processing programs. The RAM 24c temporarily stores data. The engine ECU 24 receives signals from various sensors that detect the state of the engine 22. The signals, for example, include a crank position from a crank position sensor 140, a coolant temperature Tw from a coolant temperature sensor 142, a cam position from a cam position sensor 144, a throttle valve opening degree from a throttle valve position sensor 146, an intake air flow rate Qa from an air flow meter 148, an intake air temperature from a temperature sensor 158, an intake air pressure Pin from an intake air pressure sensor 158, a catalyst temperature from a catalyst temperature sensor 134a, an air-fuel ratio from an air-fuel ratio sensor 135a, an oxygen signal from an oxygen sensor 135b, a knock signal from a knock sensor 159, an EGR valve opening degree EV from an EGR valve opening degree sensor 165, and the like, via the input port. The crank position sensor 140 detects the rotational position of the crankshaft 26. The coolant temperature sensor 142 detects the temperature of coolant of the engine 22. The cam position sensor 144 detects the rotational position of a cam shaft that opens or closes intake valves 128 and exhaust valves. The intake valves 128 introduce air-fuel mixture into the respective combustion chambers. The exhaust valves exhaust gas from the respective combustion chambers. The throttle valve position sensor 146 detects the position of the throttle valve 124. The air flow meter 148 is installed in the intake pipe. The temperature sensor 149 is also installed in the intake pipe. The intake air pressure sensor 158 detects the pressure in the intake pipe. The catalyst temperature sensor 134a is installed in the purifier 134. The knock sensor 159 is installed on a cylinder block, and detects vibrations generated as a knocking occurs. The EGR valve opening degree sensor 165 detects the opening degree of the EGR valve 164. In addition, the engine ECU 24 outputs various control signals for driving the engine 22 via the output port. The various control signals, for example, include driving signals to fuel injection valves 126, a driving signal to a throttle motor 136 that regulates the position of the throttle valve 124, control signals to ignition coils 138 integrated with ignitors, a control signal to a variable valve timing mechanism 150 that is able to change the opening and closing timings of the intake valves 128, a driving signal to a stepping motor 163 that regulates the opening degree of the EGR valve 164, and the like. The engine ECU 24 carries out data communication with the hybrid electronic control unit 70. The engine ECU 24 controls operation of the engine 22 on the basis of control signals from the hybrid electronic control unit 70, and, where necessary, outputs data regarding the operating state of the engine 22.

The thus configured hybrid vehicle 20 according to the present embodiment calculates a required torque that should be output to the ring gear shaft 32a, which serves as a drive shaft, on the basis of an accelerator operation amount Acc and a vehicle speed V corresponding to an amount by which an accelerator pedal 83 is operated by a driver, and sets a target rotational speed and target torque of the engine 22 and torque commands for the motors MG1 and MG2 so that a required power corresponding to the required torque is output to the ring gear shaft 32a. The hybrid vehicle 20 transmits the set target rotational speed and target torque to the engine ECU 24 and transmits the set torque commands to the motor ECU 40. As the engine ECU 24 receives the target rotational speed and the target torque, the engine ECU 24 executes control, such as fuel injection control, ignition control, and the like, over the engine 22 so that the engine 22 is operated at an operating state indicated by the target rotational speed and the target torque. Driving control for switching control over the inverters 41 and 42 is executed so as to drive the motors MG1 and MG2 that receive the set torque commands. Operating control over the engine 22, the motor MG1 and the motor MG2, for example, includes a torque conversion operation mode, a charge and discharge operation mode, and a motor operation mode. In the torque conversion operation mode, the engine 22 is operated so that a power corresponding to a required power is output from the engine 22, and the motor MG1 and the motor MG2 are driven so that all the power output from the engine 22 is converted in torque by a power distribution integration mechanism 30, the motor MG1 and the motor MG2 and then output to the ring gear shaft 32a. In the charge and discharge operation mode, the engine 22 is operated so that a power corresponding to the sum of a required power and an electric power necessary for charging or discharging the battery 50 is output from the engine 22, and the motor MG1 and the motor MG2 are driven so that all or part of power output from the engine 22 along with charging or discharging of the battery 50 is converted in torque by the power distribution integration mechanism 30, the motor MG1 and the motor MG2, and, as a result, a required power is output to the ring gear shaft 32a. In the motor operation mode, operation of the engine 22 is stopped, and the motor MG2 is operated so as to output power corresponding to a required power to the ring gear shaft 32a.

Figure 3:
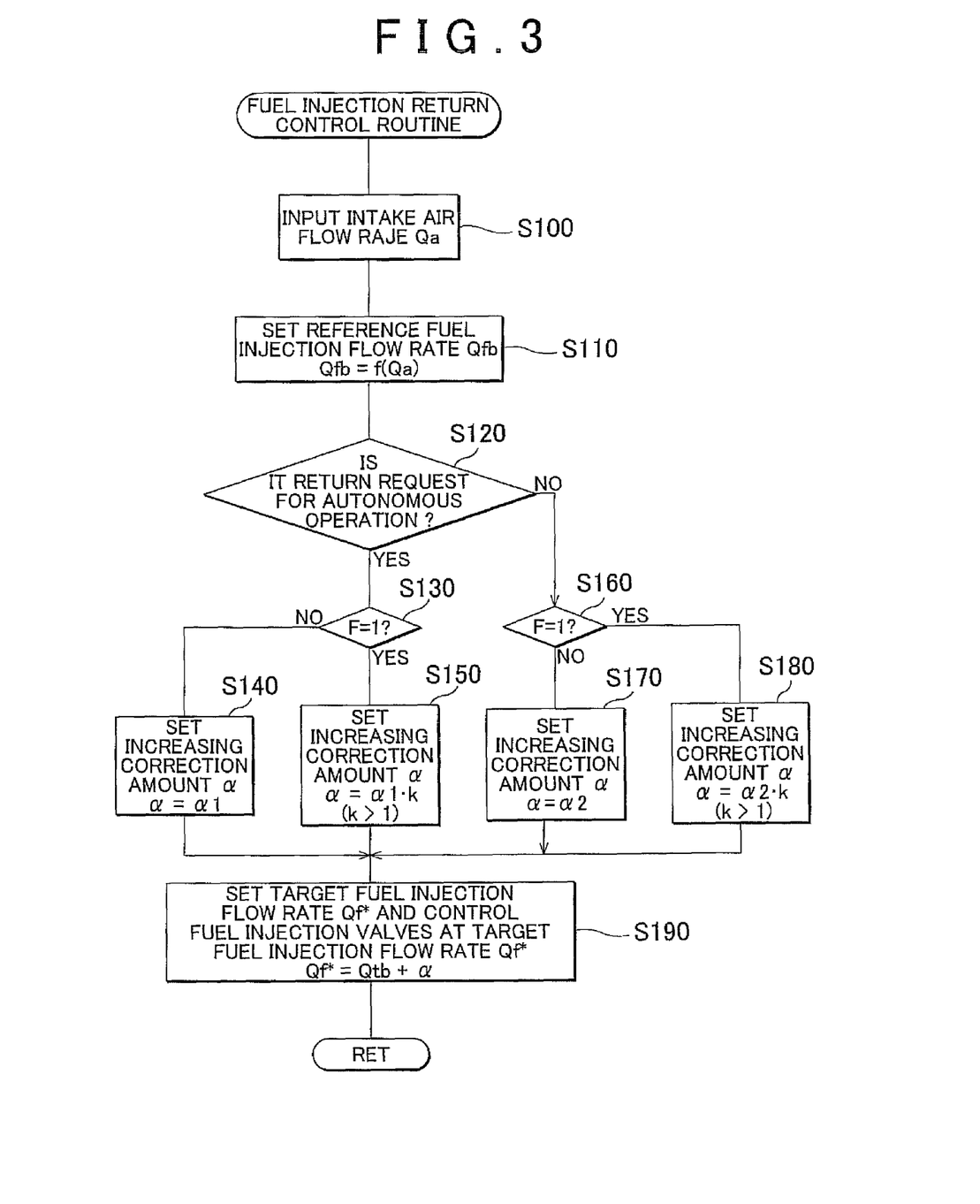
FIG. 3 is a flowchart that shows an example of a fuel injection return control routine executed by an engine ECU 24.

Next, operation of the thus configured hybrid vehicle 20 according to the present embodiment, specifically, operation at the time when fuel injection is resumed while driving in a state where fuel injection is stopped (fuel cut), will be described. FIG. 3 is a flowchart that shows an example of a fuel injection return control routine executed by the engine ECU 24. This routine is repeatedly executed at predetermined time intervals (for example, every several milliseconds) when a return request is issued. The return request requires start of fuel injection control and ignition control over the engine 22 by resuming fuel injection of the engine 22 while the vehicle is driving in a state where the accelerator pedal 83 is released and the opening degree of the throttle valve 124 is adjusted to an opening degree Thfc during fuel cut to stop fuel injection to the engine 22 (fuel cut). Here, the return request is issued during fuel cut, and when the accelerator pedal 83 is depressed to start load operation of the engine 22 or when warm-up of the engine 22 is required to start autonomous operation of the engine 22.

As the fuel injection return control routine is executed, the CPU 24a of the engine ECU 24 inputs data necessary for control, such as the intake air flow rate Qa detected by the air flow meter 148 (step S100), and executes process for setting a reference fuel injection flow rate Qfb, which is a fuel injection flow rate that gives a stoichiometric air-fuel ratio for the input intake air flow rate Qa (step S110). Subsequently, it is determined whether a return request for the engine 22 to resume fuel injection is a return request for autonomous operation of the engine 22 (step S120), and executes process for checking the value of a valve open flag F that indicates that the EGR valve 164 is open and then air larger than the intake air flow rate Qa detected by the air flow meter 148 is introduced into the combustion chambers of the engine 22 (step S130). The valve open flag F is set in an EGR valve check routine for checking the operation of the EGR valve 164, which will be described later. Here, description of the fuel injection return control routine is interrupted, and the EGR valve check routine will be described.

Figure 4:
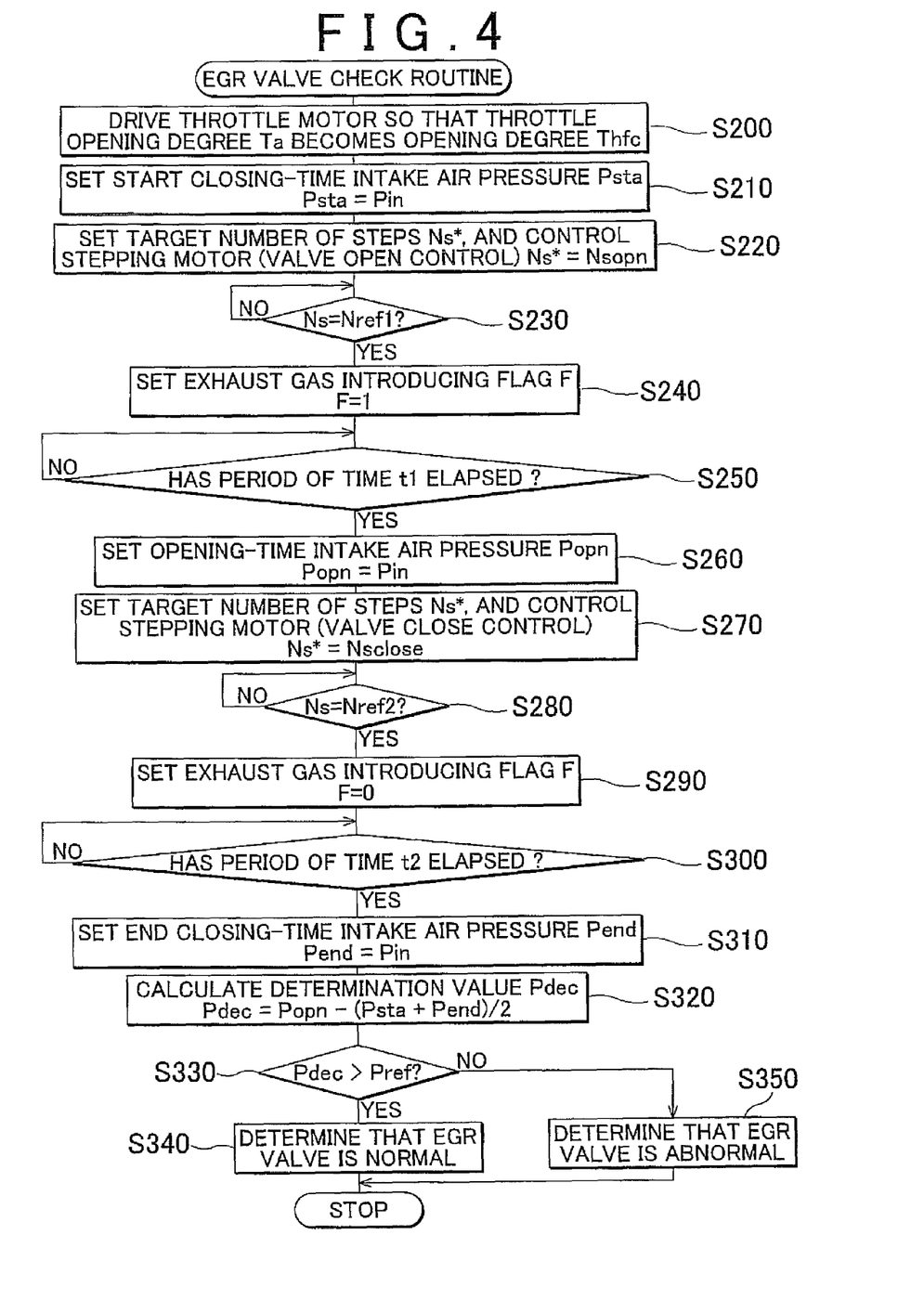
FIG. 4 is a flowchart that shows an example of an EGR valve check routine executed by the engine ECU 24.

FIG. 4 is a flowchart that shows an example of the EGR valve check routine executed by the engine ECU 24. The EGR valve check routine is executed when a valve check execution condition for checking the EGR valve 164 holds while the engine 22 is in fuel cut. Here, the valve check execution condition holds when all the following conditions are satisfied. The conditions include i) a predetermined period of time (for example, 0.8 seconds, 1.0 second, 1.2 seconds, or the like) has elapsed after the accelerator is released, ii) in a state where a variation in the intake air flow rate Qa is lower than a threshold at which it may be determined that the intake air flow rate of the engine 22 is stable, a predetermined period of time (for example, 0.8 seconds, 1.0 second, 1.2 seconds, or the like), by which it may be determined that the stable intake air flow rate has been continuing, has elapsed, iii) a predetermined period of time (for example, 0.8 seconds, 1.0 second, 1.2 seconds, or the like) necessary for the pressure in the intake pipe to become stable has elapsed after the accelerator is released and the EGR valve 164 is fully closed, and iv) the coolant temperature Tw of the engine 22 from the coolant temperature sensor 142 is higher than or equal to a predetermined temperature (for example, 65° C., 70° C., 75° C., or the like) indicating that warm-up of the engine 22 has been completed. Note that, in the present embodiment, the valve check execution condition holds when all the above described conditions are satisfied; instead, it is also applicable that the valve check execution condition holds when part of these conditions are satisfied.

As the EGR valve check routine is executed, the CPU 24a of the engine ECU 24 first drives the throttle motor 136 so that the opening degree of the throttle valve 124 is maintained at the opening degree Thfc during fuel cut (step S200), and inputs the intake air pressure Pin from the intake air pressure sensor 158 and then stores the input intake air pressure Pin in a predetermined area of the RAM 24c as a start closing-time intake air pressure Psta (step S210). Then, the CPU 24a sets a target number of steps Ns* to execute process for driving the stepping motor 163 so that the stepping motor 163 is driven by the target number of steps Ns* (step S220). The target number of steps Ns* is the number of steps of the stepping motor 163 necessary for causing the opening degree of the EGR valve 164 to change the opening degree (value=0) at the time when the valve is fully open to a predetermined checking opening degree. The predetermined checking opening degree is the opening degree of the EGR valve 164 when the valve is checked. The stepping motor 163 operates a limited number of steps in unit time. Therefore, even when control over the stepping motor 163 is started so as to attain the target number of steps Ns*, it takes a certain period of time until an actual number of steps Ns, which is an actual number of steps of the stepping motor 163, reaches the target number of steps Ns*.

As the stepping motor 163 is started to be driven in this way, wait until the actual number of steps Ns reaches the threshold Nref1 (step 230). Here, the threshold Nref1 is set as the number of steps corresponding to an excessive air introducing opening degree EBref. The excessive air introducing opening degree EBref is determined in advance through experiment, analysis, or the like, as the opening degree of the EGR valve 164, at which it may be determined that a difference between the intake air flow rate Qa detected by the air flow meter 148 and the air flow rate actually introduced into the combustion chambers of the engine 22 increases because of exhaust gas introduced into the combustion chambers of the engine 22, and then it is difficult to stably operate the engine 22 or it is difficult to output a desired torque from the engine 22 when only the intake air flow rate Qa detected by the air flow meter 148 is used to set the fuel injection flow rate without taking the flow rate of exhaust gas into consideration. That is, the process in step S230 is a process of determining whether the opening degree of the EGR valve 164 has reached the excessive air introducing opening degree EBref. As the actual number of steps Ns has reached the threshold Nref1, the valve open flag F is set at 1 (step S240). Then, after a period of time t1 (for example, 1 second, 1.2 seconds, 1.4 seconds, or the like) determined through experiment, or the like, as a period of time necessary for the pressure in the intake pipe of the engine 22 to become stable elapses after the stepping motor 163 is started to be driven (step S250), the intake air pressure Pin is input from the intake air pressure sensor 158 and is stored in a predetermined area of the RAM 24c as an opening-time intake air pressure Popn (step S260).

Subsequently, a number of steps Nsclose of the stepping motor 163 necessary for the EGR valve 164 to be fully closed from the checking opening degree is set as the target number of steps Ns* of the stepping motor 163, and the stepping motor 163 is driven in a direction to close the valve (step S270). Then, after the actual number of steps Ns reaches a threshold Nref2 as the number of steps that gives the opening degree of the EGR valve 164 lower than the excessive air introducing opening degree EBref (step S280), the valve open flag F is set at 0 (step S290). After a predetermined period of time t2 (for example, 1 second, 1.2 seconds, 1.4 seconds, or the like) that is determined through experiment, or the like, as a period of time necessary for the pressure in the intake pipe of the engine 22 to become stable elapses after the stepping motor 163 is driven (step S300), the intake air pressure Pin is input from the intake air pressure sensor 158 and is stored in a predetermined area of the RAM 24c as an end closing-time intake air pressure Pend (step S310). When the start closing-time intake air pressure Psta, the opening-time intake air pressure Popn and the end closing-time intake air pressure Pend are stored in the RAM 24c in this way, a determination value Pdec is calculated using the following mathematical expression (1) on the basis of the start closing-time intake air pressure Psta, the opening-time intake air pressure Popn and the end closing-time intake air pressure Pend (step S320). The calculated determination value Pdec is compared with a determination threshold Pref (step S330). When the determination value Pdec is larger than the determination threshold Pref, it is determined that the EGR valve 164 normally operates (step S340). When the calculated determination value Pdec is smaller than or equal to the threshold Pref, it is determined that the EGR valve 164 does not normally operate and is abnormal (step S350). Then, the EGR valve check routine ends. Here, the determination threshold Pref is determined in advance through experiment in order to determine abnormality, such as a stuck-open failure and a stuck-closed failure. In the stuck-open failure, the EGR valve 164 does not close in a state where the valve is open. In the stuck-closed failure, the EGR valve 164 does not open in a state where the valve is closed. In this way, the determination value Pdec is used when the EGR valve 164 is opened or closed to thereby make it possible to check normal operation of the EGR valve 164.

$$Pdec = Popn - (Psta + Pend)/2 \qquad (1)$$

Figure 5:
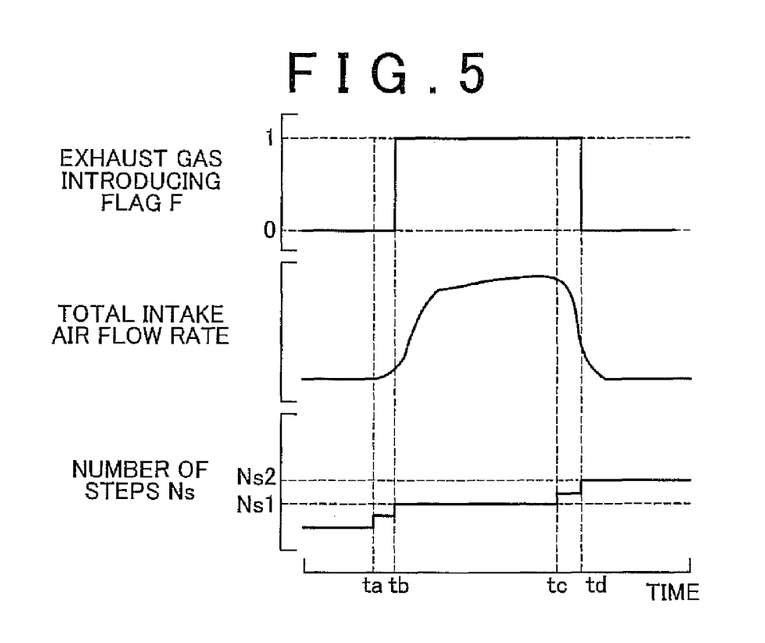
FIG. 5 is a time chart that illustrates an example of changes over time of the total air flow rate at which an intake valve 128 actually introduces air into a combustion chamber, the actual number of steps Ns and an exhaust gas introducing flag F while an EGR valve 164 is being checked.

FIG. 5 is a time chart that illustrates an example of changes over time of the total air flow rate actually introduced into the combustion chambers, the actual number of steps Ns and the valve open flag F while the EGR valve 164 is being checked. As shown in the drawing, the valve open flag F is set at 0 as an initial value. As the process in step S220 is executed and then the stepping motor 163 is started to be driven (time ta), the stepping motor 163 is driven so that the actual number of steps Ns becomes the target number of steps Ns*, and the opening degree of the EGR valve 164 gradually increases, so the total air flow rate gradually increases. Then, when the actual number of steps Ns has reached the threshold Nref1, that is, the opening degree of the EGR valve 164 has reached the excessive air introducing opening degree EBref (step S230, time tb), the valve open flag F is set at 1 (step S240). After the EGR valve 164 is opened in this way, as the stepping motor 163 is started to be driven in order to close the EGR valve 164 (step S270, time tc), the opening degree of the EGR valve 164 gradually decreases. However, the total air flow rate decreases from time t5 slightly after the opening degree of the EGR valve 164 decreases. When the actual number of steps Ns has reached the threshold Nref2, that is, when the opening degree of the EGR valve 164 has reached the excessive air introducing opening degree EBref, the valve open flag F is set at 0 (time td). In this way, the valve open flag F is set at 1 when the opening degree of the EGR valve 164 is higher than or equal to the excessive air introducing opening degree EBref, that is, only in a period of time during which there is a certain large difference between the intake air flow rate Qa detected by the air flow meter 148 and the air flow rate actually introduced into the combustion chambers. The EGR valve check routine is described above.

The description of the fuel injection return control routine will be resumed. When the return request for the engine 22 to resume fuel injection is a return request for autonomous operation of the engine 22 and the valve open flag F is 0 (steps S120 and S130), an autonomous operation correction flow rate α1 is set as an increasing correction flow rate α (step S140). The autonomous operation correction flow rate α1 is predetermined as a correction flow rate by which the reference fuel injection flow rate Qfb is increased in order to start autonomous operation of the engine 22 so that the engine 22 does not excessively enters a lean state when the opening degree of the EGR valve 164 is lower than the excessive air introducing opening degree EBref. When the return request for the engine 22 to resume fuel injection is a return request for autonomous operation of the engine 22 and the valve open flag F is 1 (steps S120 and S130), a value obtained by multiplying the autonomous operation correction flow rate α1 by a correction coefficient k (for example, 1.2, 1.25, 1.3, or the like) larger than 1 is set as an increasing correction flow rate α (step S150). Then, a value obtained by adding the set increasing correction flow rate α to the reference fuel injection flow rate Qfb set in step S110 as the target fuel injection flow rate Qf*, and the valve opening duration of each fuel injection valve 126, during which fuel injection is carried out at the target fuel injection flow rate Qf*, is controlled (step S190). Then, the fuel injection return control routine ends. Note that after fuel injection has been thus started, the engine 22 is controlled to autonomously operate at a predetermined rotational speed Nid1 (for example, 800 rpm, 900 rpm, 1000 rpm, or the like). Through the above control, when the valve open flag F is 1, that is, when there is a certain difference between the intake air flow rate Qa detected by the air flow meter 148 and the air flow rate actually introduced into the combustion chambers, a large amount of fuel is injected in comparison with when the valve open flag F is 0, that is, there is not much difference between the intake air flow rate Qa detected by the air flow meter 148 and the air flow rate actually introduced into the combustion chambers. Thus, it is possible to prevent a situation that the engine 22 enters a lean state to deteriorate a combustion state when operation of the engine 22 is started. By so doing, fuel injection is further appropriately resumed to make it possible to start autonomous operation of the engine 22.

When the return request for the engine 22 to resume fuel injection is a return request for load operation of the engine 22 (step S120), the value of the valve open flag F is further checked (step S160). When the valve open flag F is 0, a load operation correction flow rate α2 is set as an increasing correction flow rate α (step S170). The load operation correction flow rate α2 is predetermined as a correction flow rate by which the reference fuel injection flow rate Qf is increased in order to start load operation of the engine 22 so that the engine 22 does not excessively enters a lean state and does not excessively decreases power when the opening degree of the EGR valve 164 is lower than the excessive air introducing opening degree EBref (step S170). When the valve open flag F is 1, a value obtained by multiplying the load operation correction flow rate α2 by the above described correction coefficient k is set as an increasing correction flow rate α (step S180). Then, a value obtained by adding the set increasing correction flow rate α to the reference fuel injection flow rate Qfb set in step S110 as the target fuel injection flow rate Qf*, and the valve opening duration of each fuel injection valve 126, during which fuel injection is carried out at the target fuel injection flow rate Qf*, is controlled (step S190). Then, the fuel injection return control routine ends. Note that after fuel injection has been thus started, the engine 22 is controlled to start load operation. Here, the load operation correction flow rate α2 is set at a value different from the normal autonomous operation correction flow rate α1, so the increasing correction flow rate α set in the process in step S180 differs from the increasing correction flow rate α set in the process in step S150. Through the above control, when the valve open flag F is 1, that is, when there is a certain difference between the intake air flow rate Qa detected by the air flow meter 148 and the air flow rate actually introduced into the combustion chambers, a large amount of fuel is injected in comparison with when the valve open flag F is 0, that is, there is not much difference between the intake air flow rate Qa detected by the air flow meter 148 and the air flow rate actually introduced into the combustion chambers. Thus, it is possible to prevent a situation that the engine 22 enters a lean state to deteriorate a combustion state or make the engine 22 difficult to output a desired torque when load operation of the engine 22 is started. By so doing, fuel injection is further appropriately resumed to make it possible to start load operation of the engine 22.

With the hybrid vehicle 20 according to the above described embodiment, when the valve open flag F is 1, that is, when the opening degree of the EGR valve 164 is higher than or equal to the excessive air introducing opening degree EBref, a value obtained by adding the increasing correction flow rate α, which is set to be larger than the increasing correction flow rate α used when the valve open flag F is 0 (the autonomous operation correction flow rate α1 or the load operation correction flow rate α2), to the reference fuel injection flow rate Qfb is set as the target fuel injection flow rate Qf*, and fuel injection is carried out at the set target fuel injection flow rate Qf*, so it is possible to further appropriately resume fuel injection to autonomously operate the engine 22 or operate the engine 22 under a load. In addition, fuel injection is carried out at the thus set target fuel injection flow rate Qf* while the valve is being checked, so it is possible to further appropriately resume fuel injection when fuel injection is resumed while the valve is being checked as well.

In the hybrid vehicle 20 according to the embodiment, the same correction coefficient k is used to set the increasing correction flow rates a in the process in step S150 and the process in step S180. Instead, different correction coefficients may be used to set the increasing correction flow rates α in the process in step S150 and the process in step S180.

In the hybrid vehicle 20 according to the embodiment, the increasing correction flow rate α set in the process in step S150 and the increasing correction flow rate α set in the process in step S180 are different; instead, they may be the same.

In the hybrid vehicle 20 according to the embodiment, in the EGR valve check routine shown in FIG. 3, the actual number of steps of the stepping motor 163 is compared with the thresholds Nref1 and Nref2; instead, an actual opening degree of the EGR valve 164 may be compared with an exhaust gas start introducing opening degree EBref.

In the hybrid vehicle 20 according to the embodiment, the aspect of the invention is applied to control that is executed to resume fuel injection to the engine 22 while the EGR valve 164 is being checked. Instead, the aspect of the invention may be applied to control that is executed to resume fuel injection to the engine 22 when the EGR valve 164 is not checked, such as when a return request is issued in a state where the valve check execution condition does not hold during fuel cut.

Figure 6:
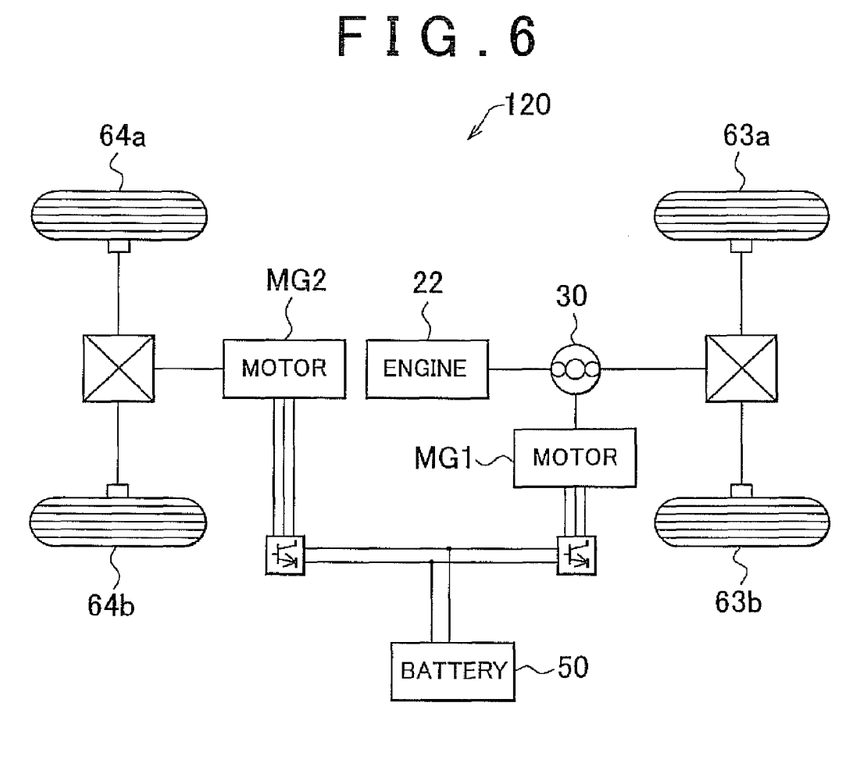
FIG. 6 is a configuration diagram that shows the schematic configuration of a hybrid vehicle 120 according to an alternative embodiment to the embodiment of the invention.

In the hybrid vehicle 20 according to the embodiment, power of the motor MG2 is output to the ring gear shaft 32*a* while the speed is varied by the reduction gear 35. Instead, as is illustrated in a hybrid vehicle 120 according to an alternative embodiment shown in FIG. 6, power of the motor MG2 may be output to axles (axles connected to driving wheels 64*a* and 64*b* in FIG. 6) different from axles connected to the ring gear shaft 32*a* (axles to which the driving wheels 63*a* and 63*b* are connected).

In addition, the aspect of the invention is not limited to such hybrid vehicles. The aspect of the invention may be an embodiment of an internal combustion engine system that is equipped for mobile units, such as vehicles, ships and airplanes. The vehicles, for example, include an automobile that drives using only power from an engine without a motor that outputs driving power and a train other than an automobile. The aspect of the invention may also be an embodiment of an internal combustion engine system assembled to stationary equipment, such as construction equipment. Furthermore, the aspect of the invention may be an embodiment of a method of controlling the above internal combustion engine system.

In regard to the internal combustion engine system according to the embodiment of the invention, the engine 22 is an example of "internal combustion engine", the air flow meter 148 is an example of "intake air flow rate detecting device", and the engine ECU 24 that, when fuel injection is resumed at the time when fuel injection to the engine 22 in operation is stopped, executes the processes in steps S100 to S140, S160, S170 and S190 of the fuel injection return control routine shown in FIG. 3, in which the value α1 or the value α2 is set as the increasing correction flow rate α to set a fuel injection flow rate obtained by adding the increasing correction flow rate α to the reference fuel injection flow rate Qfb as the target fuel injection flow rate Qf* when the valve open flag F is 0, and the fuel injection valves 126 are driven so that fuel injection is carried out at the target fuel injection flow rate Qf*, and that executes the processes of steps S100 to S130, S150, S160, S180 and S190, in which a fuel injection flow rate obtained by multiplying the value α1 by the correction coefficient k1 or a value obtained by multiplying the value α2 by the correction coefficient k2 is set as the increasing correction flow rate when the valve open flag F is 1, a fuel injection flow rate obtained by adding the increasing correction flow rate α to the reference fuel injection flow rate Qfb is set as the target fuel injection flow rate Qf*, and the fuel injection valves 126 are driven so that fuel injection is carried out at the target fuel injection flow rate Qf*, is an example of "controller". In addition, the intake air pressure sensor 158 is an example of "intake air pressure detecting device", and the engine ECU 24 that executes the process of step S200 of the EGR valve check routine shown in FIG. 4, in which the throttle motor 136 is driven so as to maintain the opening degree of the throttle valve 124 at the opening degree Thfc when the valve check execution condition for checking the EGR valve 164 holds while the opening degree of the throttle valve 124 is set at the opening degree Thfc as the accelerator is released and fuel injection control or ignition control over the engine 22 is stopped in a state where the EGR valve 164 is fully closed, and that executes the processes of steps S210 to S350, in which it is determined whether the EGR valve 164 is normally operated on the basis of the start closing-time intake air pressure Psta and the end closing-time intake air pressure Pend when the EGR valve 164 is closed and the opening-time intake air pressure Popn when the EGR valve 164 is open, is an example of "valve check execution unit". In regard to the vehicle according to the aspect of the invention, the motor MG1 is an example of "generator", the power distribution integration mechanism 30 is an example of "triaxial power input/output device", and the motor MG2 is an example of "electric motor".

Here, the "internal combustion engine" is not limited to the engine 22; it may be any internal combustion engine as long as an internal combustion engine includes an exhaust gas recirculation system that opens a valve for regulating the supply of exhaust gas to an intake system to recirculate exhaust gas to the intake system. The "intake air flow rate detecting device" is not limited to the air flow meter 148; it may be any device as long as a device detects the intake air flow rate of the internal combustion engine. The "controller" is not limited to the one that, when fuel injection is resumed at the time when fuel injection to the engine 22 in operation is stopped, sets the value α1 or the value α2 as the increasing correction flow rate α to set a fuel injection flow rate obtained by adding the increasing correction flow rate α to the reference fuel injection flow rate Qfb as the target fuel injection flow rate Qf* when the valve open flag F is 0, and drives the fuel injection valves 126 so that fuel injection is carried out at the target fuel injection flow rate Qf*, and sets a value obtained by multiplying the value α1 by the correction coefficient k1 or a value obtained by multiplying the value α2 by the correction coefficient k2 as the increasing correction flow rate when the valve open flag F is 1, and sets a fuel injection flow rate obtained by adding the increasing correction flow rate α to the reference fuel injection flow rate Qfb as the target fuel injection flow rate Qf*, and then drives the fuel injection valves 126 so that fuel injection is carried out at the target fuel injection flow rate Qf*. Instead, it may be any controller that, when fuel injection to the internal combustion engine is resumed while fuel injection to the internal combustion engine in operation is stopped, controls the internal combustion engine so that, when the opening degree of a valve of an exhaust gas recirculation system is lower than a predetermined opening degree, fuel injection to the internal combustion engine is started at a fuel injection flow rate that is obtained by adding a first increasing correction flow rate to a reference fuel injection flow rate that is set so as to give a stoichiometric air-fuel ratio on the basis of the detected intake air flow rate, and controls the internal combustion engine so that, when the opening degree of the valve of the exhaust gas recirculation system is higher than or equal to the predetermined opening degree, fuel injection to the internal combustion engine is started at a fuel injection flow rate that is obtained by adding a second increasing correction flow rate, which is set to be larger than the first increasing correction flow rate, to the reference fuel injection flow rate. In addition, the "intake air pressure detecting device" is not limited to the intake air pressure sensor 158; it may be any device as long as a device detects the intake air pressure, which is the pressure of intake air in the intake system. The "valve check execution unit" is not limited to the one that drives the throttle motor 136 so as to maintain the opening degree of the throttle valve 124 at the opening degree Thfc when the valve check execution condition for checking the EGR valve 164 holds while the opening degree of the throttle valve 124 is set at the opening degree Thfc as the accelerator is released and fuel injection control or ignition control over the engine 22 is stopped in a state where the EGR valve 164 is fully closed, and that determines whether the EGR valve 164 is normally operated on the basis of the start closing-time intake air pressure Psta and the end closing-time intake air pressure Pend when the EGR valve 164 is closed and the opening-time intake air pressure Popn when the EGR valve 164 is opened. Instead, it may be any device as long as a device, when a predetermined check condition for checking normal operation of the valve holds while fuel injection to the internal combustion engine in operation is stopped, executes valve check for checking whether the valve is normally operated on the basis of the intake air pressure detected along with valve open control for opening the valve of the exhaust gas recirculation system and valve close control for closing the valve of the exhaust gas recirculation system when the opening degree of the throttle valve of the internal combustion engine is set at a predetermined opening degree in a state where the stop of fuel injection to the internal combustion engine is continued. In the vehicle, the "generator" is not limited to the motor MG2 configured as a synchronous power generator; it may be any generator, such as an induction electric motor, as long as a generator is able to input or output power The "triaxial power input/output device" is not limited to the above described power distribution integration mechanism 30; it may be any device, such as a device that uses a double pinion type planetary gear mechanism, a device that is formed of a combination of a plurality of planetary gear mechanisms and a device, such as a differential gear, that has a differential function different from a planetary gear, as long as a device that is connected to three shafts, that is, a drive shaft coupled to an axle, an output shaft of the internal combustion engine and a rotary shaft of the generator, and that, on the basis of powers input to or output from any two of the three shafts, inputs or outputs power to or from the remaining shaft. The "electric motor" is not limited to the motor MG2 that is configured as a synchronous generator motor; it may be any electric motor, such as an induction electric motor, as long as an electric motor is able to input or output power to or from the drive shaft.

The aspect of the invention is, for example, usable in manufacturing industry for an internal combustion engine system or a vehicle.

While some embodiments of the invention have been illustrated above, it is to be understood that the invention is not limited to details of the illustrated embodiments, but may be embodied with various changes, modifications or improvements, which may occur to those skilled in the art, without departing from the scope of the invention.

What is claimed is:

1. An internal combustion engine system comprising:
an internal combustion engine;
an exhaust gas recirculation system that includes a valve for regulating a flow rate at which exhaust gas from the internal combustion engine is supplied to an intake system of the internal combustion engine, and that opens the valve to recirculate the exhaust gas to the intake system;
an intake air flow rate detecting device that detects an air flow rate at which air is introduced into the internal combustion engine; and
a controller that, when fuel injection in the internal combustion engine in operation is stopped, controls the internal combustion engine so that i) the fuel injection is started at a fuel injection flow rate that is obtained by adding a first increasing correction flow rate to a reference fuel injection flow rate that is set so as to give a stoichiometric air-fuel ratio on the basis of the detected air flow rate when the opening degree of the valve is lower than a predetermined opening degree, and controls the internal combustion engine so that ii) the fuel injection is started at a fuel injection flow rate that is obtained by adding a second increasing correction flow rate, which is set to be larger than the first increasing correction flow rate, to the reference fuel injection flow rate when the opening degree of the valve is higher than or equal to the predetermined opening degree.

2. The internal combustion engine system according to claim 1, further comprising:
an intake air pressure detecting device that detects an intake air pressure, which is a pressure of air in the intake system; and
a valve check execution unit that, when the fuel injection is stopped and a predetermined check condition for checking normal operation of the valve holds, executes valve check for checking whether the valve is normally operated on the basis of the intake air pressure detected along with open valve control for opening the valve of the exhaust gas recirculation system and valve close control for closing the valve of the exhaust gas recirculation system while the opening degree of a throttle valve of the internal combustion engine is set at a predetermined opening degree in a state where the stop of the fuel injection is continued, wherein
the controller, when the valve is being checked by the valve check execution unit, controls the internal combustion engine so that the fuel injection is started at a fuel injection flow rate that is obtained by adding the first increasing correction flow rate to the reference fuel injection flow rate i) when the opening degree of the valve of the exhaust gas recirculation system is lower than the predetermined opening degree, and controls the internal combustion engine so that the fuel injection is started at a fuel injection flow rate that is obtained by adding the second increasing correction flow rate to the reference fuel injection flow rate ii) when the opening degree of the valve of the exhaust gas recirculation system is higher than or equal to the predetermined opening degree.

3. The internal combustion engine system according to claim 1, wherein the controller, when the fuel injection is stopped, controls the internal combustion engine so that fuel injection to the internal combustion engine is started at a fuel injection flow rate that is obtained by adding the second increasing correction flow rate to the reference fuel injection flow rate in order to start load operation of the internal combustion engine i) when the opening degree of the valve of the exhaust gas recirculation system is higher than or equal to the predetermined opening degree, and controls the internal combustion engine so that fuel injection to the internal combustion engine is started at a fuel injection flow rate that is obtained by adding a third increasing correction flow rate, which is different from the second increasing correction flow rate, to the reference fuel injection flow rate in order to start autonomous operation of the internal combustion engine ii) when the opening degree of the valve of the exhaust gas recirculation system is higher than or equal to the predetermined opening degree.

4. The internal combustion engine system according to claim 2, wherein the predetermined check condition holds when a predetermined period of time has elapsed after the valve is fully closed.

5. The internal combustion engine system according to claim 2, further comprising a coolant temperature detecting device that detects a coolant temperature, which is a temperature of coolant that cools the internal combustion engine, wherein
the predetermined check condition holds when the coolant temperature is higher than or equal to a predetermined temperature.

6. A vehicle comprising the internal combustion engine system according to claim 1.

7. The vehicle according to claim 6, further comprising:
a generator that is able to input or output power;
a triaxial power input/output device that is connected to three shafts of a drive shaft coupled to an axle, an output shaft of the internal combustion engine and a rotary shaft of the generator and that, on the basis of powers input to or output from any two of the three shafts, inputs or outputs power to or from the remaining shaft; and
an electric motor that is able to input or output power to or from the drive shaft.

8. A control method for an internal combustion engine system that includes an internal combustion engine, a valve that regulates a flow rate at which exhaust gas from the internal combustion engine is supplied to an intake system of the internal combustion engine, and an exhaust gas recirculation system that opens the valve to recirculate the exhaust gas to the intake system, comprising:
when fuel injection in the internal combustion engine in operation is stopped, controlling the internal combustion engine so that the fuel injection is started at a fuel injection flow rate that is obtained by adding a first increasing correction flow rate to a reference fuel injection flow rate set to give a stoichiometric air-fuel ratio on the basis of an intake air flow rate of the internal combustion engine i) when the opening degree of the valve is lower than a predetermined opening degree, and controlling the internal combustion engine so that the fuel injection is started at a fuel injection flow rate that is obtained by adding a second increasing correction flow rate, which is set to be larger than the first increasing correction flow rate, to the reference fuel injection flow rate ii) when the opening degree of the valve is higher than or equal to the predetermined opening degree.

9. The control method according to claim 8, further comprising:
when the fuel injection is stopped, and when a predetermined check condition for checking normal operation of the valve holds, executing valve check for checking whether the valve is normally operated on the basis of the intake air pressure detected along with open valve control for opening the valve of the exhaust gas recirculation system and valve close control for closing the valve of the exhaust gas recirculation system while the opening degree of a throttle valve of the internal combustion engine is set at a predetermined opening degree in a state where the stop of the fuel injection is continued, wherein
when the valve check is being executed, the internal combustion engine is controlled so that the fuel injection is started at a fuel injection flow rate that is obtained by adding the first increasing correction flow rate to the reference fuel injection flow rate i) when the opening degree of the valve of the exhaust gas recirculation system is lower than the predetermined opening degree, and the internal combustion engine is controlled so that the fuel injection is started at a fuel injection flow rate that is obtained by adding the second increasing correction flow rate to the reference fuel injection flow rate ii) when the opening degree of the valve of the exhaust gas recirculation system is higher than or equal to the predetermined opening degree.

10. The control method according to claim 8, wherein, when the fuel injection is stopped, the internal combustion engine is controlled so that fuel injection to the internal combustion engine is started at a fuel injection flow rate that is obtained by adding the second increasing correction flow rate to the reference fuel injection flow rate in order to start load operation of the internal combustion engine i) when the opening degree of the valve of the exhaust gas recirculation system is higher than or equal to the predetermined opening degree, and the internal combustion engine is controlled so that fuel injection to the internal combustion engine is started at a fuel injection flow rate that is obtained by adding a third increasing correction flow rate, which is different from the second increasing correction flow rate, to the reference fuel injection flow rate in order to start autonomous operation of the internal combustion engine ii) when the opening degree of the valve of the exhaust gas recirculation system is higher than or equal to the predetermined opening degree.

11. The control method according to claim 9, wherein the predetermined check condition holds when a predetermined period of time has elapsed after the valve is fully closed.

12. The control method according to claim 9, further comprising detecting a coolant temperature, which is a temperature of coolant that cools the internal combustion engine, wherein
the predetermined check condition holds when the coolant temperature is higher than or equal to a predetermined temperature.

* * * * *